US010841800B2

(12) United States Patent
Xiong et al.

(10) Patent No.: US 10,841,800 B2
(45) Date of Patent: Nov. 17, 2020

(54) SYSTEM AND METHOD FOR WIRELESS SCREEN PROJECTION

(71) Applicant: Alibaba Group Holding Limited, Grand Cayman (KY)

(72) Inventors: Lin Xiong, Hangzhou (CN); Fan Yang, Hangzhou (CN); Jianhua Feng, Hangzhou (CN); Qinghua Wang, Hangzhou (CN); Xiaosen Dong, Hangzhou (CN); Qingfu Meng, Hangzhou (CN); Xuoing Nie, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 284 days.

(21) Appl. No.: 15/935,801

(22) Filed: Mar. 26, 2018

(65) Prior Publication Data

US 2018/0309753 A1 Oct. 25, 2018

(30) Foreign Application Priority Data

Apr. 19, 2017 (CN) .......................... 2017 1 0258303

(51) Int. Cl.
*H04W 12/08* (2009.01)
*H04L 29/06* (2006.01)
(Continued)

(52) U.S. Cl.
CPC ...... *H04W 12/0802* (2019.01); *G06F 3/1423* (2013.01); *H04L 63/0861* (2013.01);
(Continued)

(58) Field of Classification Search
CPC ....... H04W 12/00503; H04W 12/0802; H04W 12/04; H04W 12/08; H04L 63/0861;
(Continued)

(56) References Cited

U.S. PATENT DOCUMENTS 5,307,410 A    4/1994  Bennett
5,675,648 A   10/1997  Townsend
(Continued)

FOREIGN PATENT DOCUMENTS

CN    101222488    7/2008
CN    101741852    6/2010
(Continued)

OTHER PUBLICATIONS

Baker et al. "Recommendation for Key Management—Part 1: General (Revision 3)", NIST Special Publication 800-57, Jul. 2012 (Year:2012).
(Continued)

*Primary Examiner* — Ashokkumar B Patel
*Assistant Examiner* — William B Jones
(74) *Attorney, Agent, or Firm* — Shun Yao; Park, Vaughan, Fleming & Dowler LLP

(57) ABSTRACT

One embodiment provides a computer system (e.g., a client computing device) for facilitating screen projection, the first computer system comprising a processor and a memory coupled to the processor and storing instructions, which when executed by the processor cause the processor to perform a method, the method comprising: detecting a sound signal associated with a secondary display system, wherein the sound signal includes a passcode; extracting the passcode from the sound signal; processing the passcode; and transmitting data displayed on the computer system to the secondary display system, thereby allowing information displayed on the computer system to be displayed on the secondary display system.

20 Claims, 10 Drawing Sheets

(51) Int. Cl.
   *G06F 3/14* (2006.01)
   *H04W 12/00* (2009.01)
   *H04W 12/04* (2009.01)

(52) U.S. Cl.
   CPC ..... *H04W 12/00503* (2019.01); *H04W 12/04* (2013.01); *G09G 2358/00* (2013.01); *G09G 2370/022* (2013.01); *G09G 2370/04* (2013.01); *G09G 2370/06* (2013.01)

(58) Field of Classification Search
   CPC .............. G06F 3/1423; G09G 2358/00; G09G 2370/04; G09G 2370/06; G09G 2370/022
   See application file for complete search history.

(56) References Cited

U.S. PATENT DOCUMENTS

| | | | |
|---|---|---|---|
| 6,505,247 B1 | 1/2003 | Steger | |
| 8,041,335 B2 * | 10/2011 | Khetawat | H04L 63/104 455/404.2 |
| 8,266,433 B1 | 9/2012 | Przykucki | |
| 8,990,550 B1 | 3/2015 | Hushon | |
| 9,077,577 B1 | 7/2015 | Ashrafi | |
| 9,130,742 B2 | 9/2015 | Yao | |
| 9,294,267 B2 | 3/2016 | Kamath | |
| 9,323,901 B1 | 4/2016 | Nair | |
| 9,698,979 B2 | 7/2017 | Armstrong | |
| 9,830,467 B1 | 11/2017 | Harold | |
| 9,887,976 B2 | 2/2018 | Hughes | |
| 2001/0023416 A1 | 9/2001 | Hosokawa | |
| 2005/0071632 A1 | 3/2005 | Pauker | |
| 2005/0071677 A1 | 3/2005 | Khanna | |
| 2005/0135620 A1 | 6/2005 | Kastella | |
| 2005/0144440 A1 | 6/2005 | Catherman | |
| 2005/0144484 A1 | 6/2005 | Wakayama | |
| 2005/0259825 A1 | 11/2005 | Trifonov | |
| 2006/0026693 A1 | 2/2006 | Bade | |
| 2006/0056630 A1 | 3/2006 | Zimmer | |
| 2007/0016794 A1 | 1/2007 | Harrison | |
| 2007/0076889 A1 | 4/2007 | Derobertis | |
| 2007/0147292 A1 | 6/2007 | Van Ewijk | |
| 2007/0192598 A1 | 8/2007 | Troxel | |
| 2008/0065881 A1 | 3/2008 | Dawson | |
| 2008/0114983 A1 | 5/2008 | Sherkin | |
| 2008/0123859 A1 | 5/2008 | Mamidwar | |
| 2008/0165973 A1 | 7/2008 | Miranda Gavillan | |
| 2008/0219449 A1 | 9/2008 | Ball | |
| 2008/0222734 A1 | 9/2008 | Redlich | |
| 2009/0019285 A1 | 1/2009 | Chen | |
| 2009/0034733 A1 | 2/2009 | Raman | |
| 2009/0055892 A1 | 2/2009 | Lu | |
| 2009/0092252 A1 | 4/2009 | Noll | |
| 2009/0106551 A1 | 4/2009 | Boren | |
| 2009/0125444 A1 | 5/2009 | Cochran | |
| 2009/0204812 A1 | 8/2009 | Baker | |
| 2009/0262942 A1 | 10/2009 | Maeda | |
| 2009/0271634 A1 | 10/2009 | Boult | |
| 2010/0132015 A1 | 5/2010 | Lee | |
| 2010/0169953 A1 | 7/2010 | Hofer | |
| 2010/0199336 A1 | 8/2010 | Tan | |
| 2010/0211787 A1 | 8/2010 | Bukshpun | |
| 2010/0265077 A1 | 10/2010 | Humble | |
| 2010/0277435 A1 | 11/2010 | Han | |
| 2010/0299526 A1 | 11/2010 | Wiseman | |
| 2011/0069972 A1 | 3/2011 | Wiseman | |
| 2011/0099367 A1 | 4/2011 | Thom | |
| 2011/0126011 A1 | 5/2011 | Choi | |
| 2011/0167503 A1 | 7/2011 | Horal | |
| 2011/0209202 A1 | 8/2011 | Otranen | |
| 2011/0213979 A1 | 9/2011 | Wiseman | |
| 2011/0231615 A1 | 9/2011 | Ober | |
| 2012/0045002 A1 | 2/2012 | Zivkovic | |
| 2012/0084570 A1 | 4/2012 | Kuzin | |
| 2012/0087500 A1 | 4/2012 | Ukita | |
| 2012/0166993 A1 | 6/2012 | Anderson | |
| 2012/0177201 A1 | 7/2012 | Ayling | |
| 2012/0210408 A1 | 8/2012 | Lu | |
| 2012/0250863 A1 | 10/2012 | Bukshpun | |
| 2012/0265892 A1 | 10/2012 | Ma | |
| 2013/0083926 A1 | 4/2013 | Hughes | |
| 2013/0101119 A1 | 4/2013 | Nordholt | |
| 2013/0208894 A1 | 8/2013 | Bovino | |
| 2013/0219454 A1 | 8/2013 | Hewinson | |
| 2013/0227286 A1 | 8/2013 | Brisson | |
| 2013/0246641 A1 | 9/2013 | Vimpari | |
| 2013/0251145 A1 | 9/2013 | Lowans | |
| 2013/0259233 A1 | 10/2013 | Baba | |
| 2013/0308506 A1 * | 11/2013 | Kim | H04W 12/04 370/310 |
| 2013/0315395 A1 | 11/2013 | Jacobs | |
| 2014/0068765 A1 | 3/2014 | Choi | |
| 2014/0104137 A1 * | 4/2014 | Brown | G06F 3/1423 345/1.1 |
| 2014/0141725 A1 | 5/2014 | Jesme | |
| 2014/0173713 A1 | 6/2014 | Zheng | |
| 2014/0237565 A1 | 8/2014 | Fleysher | |
| 2014/0259138 A1 | 9/2014 | Fu | |
| 2014/0281511 A1 | 9/2014 | Kaushik | |
| 2014/0331050 A1 | 11/2014 | Armstrong | |
| 2014/0351915 A1 | 11/2014 | Otranen | |
| 2015/0046709 A1 | 2/2015 | Anspach | |
| 2015/0062904 A1 | 3/2015 | Sanga | |
| 2015/0089624 A1 | 3/2015 | Kim | |
| 2015/0095987 A1 | 4/2015 | Potash | |
| 2015/0134727 A1 | 5/2015 | Lee | |
| 2015/0134947 A1 | 5/2015 | Varcoe | |
| 2015/0181308 A1 | 6/2015 | Ducharme | |
| 2015/0207926 A1 | 7/2015 | Brown | |
| 2015/0222619 A1 | 8/2015 | Hughes | |
| 2015/0236852 A1 | 8/2015 | Tanizawa | |
| 2015/0270963 A1 | 9/2015 | Tanizawa | |
| 2015/0271147 A1 | 9/2015 | Tanizawa | |
| 2015/0288517 A1 | 10/2015 | Evans | |
| 2015/0288542 A1 | 10/2015 | Ashrafi | |
| 2015/0309924 A1 | 10/2015 | Chen | |
| 2015/0317469 A1 | 11/2015 | Liu | |
| 2015/0325242 A1 | 11/2015 | Lu | |
| 2015/0326613 A1 | 11/2015 | Devarajan | |
| 2015/0350181 A1 | 12/2015 | Call | |
| 2015/0379261 A1 | 12/2015 | Daigle | |
| 2015/0381363 A1 | 12/2015 | Teixeira | |
| 2016/0013937 A1 | 1/2016 | Choi | |
| 2016/0021068 A1 | 1/2016 | Jueneman | |
| 2016/0080708 A1 | 3/2016 | Urata | |
| 2016/0087946 A1 | 3/2016 | Yang | |
| 2016/0105439 A1 | 4/2016 | Hunt | |
| 2016/0127127 A1 | 5/2016 | Zhao | |
| 2016/0149700 A1 | 5/2016 | Fu | |
| 2016/0210105 A1 | 7/2016 | Ru | |
| 2016/0226846 A1 | 8/2016 | Fu | |
| 2016/0241396 A1 | 8/2016 | Fu | |
| 2016/0248581 A1 | 8/2016 | Fu | |
| 2016/0294783 A1 | 10/2016 | Piqueras Jover | |
| 2016/0337329 A1 | 11/2016 | Sood | |
| 2016/0359839 A1 | 12/2016 | Natividad | |
| 2016/0366713 A1 * | 12/2016 | Sonnino | G09G 5/12 |
| 2017/0034167 A1 | 2/2017 | Figueira | |
| 2017/0104588 A1 | 4/2017 | Camenisch | |
| 2017/0230173 A1 | 8/2017 | Choi | |
| 2017/0302448 A1 | 10/2017 | Luk | |
| 2017/0324730 A1 | 11/2017 | Otranen | |
| 2018/0048466 A1 | 2/2018 | Chen | |
| 2018/0063709 A1 | 3/2018 | Morrison | |
| 2018/0077449 A1 * | 3/2018 | Herz | H04N 21/436 |
| 2018/0262907 A1 | 9/2018 | Alanis | |
| 2018/0351734 A1 | 12/2018 | Zhao | |

FOREIGN PATENT DOCUMENTS

| | | |
|---|---|---|
| CN | 102946313 | 2/2013 |
| CN | 104486307 | 4/2015 |
| CN | 104579694 | 4/2015 |
| CN | 104780040 | 7/2015 |
| EP | 0962070 | 12/1999 |

(56) References Cited

FOREIGN PATENT DOCUMENTS

| | | |
|---|---|---|
| EP | 3007478 | 4/2016 |
| WO | 2012098543 | 7/2012 |
| WO | 2013026086 | 2/2013 |
| WO | 2016070141 | 5/2016 |

OTHER PUBLICATIONS

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

Mark Hillery et al. "Quantum Secret Sharing", American Physical Society 1999.

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www.elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

\* cited by examiner

SYSTEM AND METHOD FOR WIRELESS SCREEN PROJECTION

RELATED APPLICATION

Under 35 U.S.C. 119, this application claims the benefit and right of priority of Chinese Patent Application No. 201710258303.7, filed 19 Apr. 2017.

BACKGROUND

Field

This disclosure is generally related to wireless communication. More specifically, this disclosure is related to a system and method for wireless screen projection.

Related Art

The progress of technology includes the communication of electronic data, including via wireless communication. One area of wireless communication is wireless screen projection (e.g., in a meeting room), where information on a client device is transmitted wirelessly to a projector device, which displays the data of the client device. Current technologies for wireless screen projection require a user to manually input a "passcode" in order to establish the connection and facilitate the wireless screen projection.

However, manual input may result in user errors, which can cause a failure of the wireless screen projection and decrease the success rate of the wireless screen projection. Furthermore, a user may forget to turn off the projector device when leaving the meeting room, which can result in a security breach.

SUMMARY

One embodiment provides a computer system (e.g., a client computing device) for facilitating screen projection, the first computer system comprising a processor and a memory coupled to the processor and storing instructions, which when executed by the processor cause the processor to perform a method, the method comprising: detecting a sound signal associated with a secondary display system, wherein the sound signal includes a passcode; extracting the passcode from the sound signal; processing the passcode; and transmitting data displayed on the computer system to the secondary display system, thereby allowing information displayed on the computer system to be displayed on the secondary display system.

In some embodiments, processing the passcode further comprises transmitting the passcode to a third computer system, wherein the passcode is encoded based on an audio protocol, wherein transmitting the passcode and the data to the third computer system causes the third computer system to: receive the encoded passcode and the data; decode the encoded passcode based on the audio protocol to obtain the passcode; identify the secondary display system as corresponding to the passcode based on a lookup in a data structure; and transmit the data to the secondary display system.

In some embodiments, transmitting the data to the secondary display system causes the secondary display system to: receive the data; and display, on the secondary display system, information which is the same as the information displayed on the computer system.

In some embodiments, the third computer system is configured to store, in the data structure, one or more of: a mapping between the passcode and the secondary display system; a mapping between one or more other passcodes and the secondary display system; and a mapping between the passcode or passcodes and a fourth computer system, wherein the secondary display system is coupled to the fourth computer system, wherein the third computer system creates the stored mappings or wherein the third computer system stores the mappings based on a notification from the first computer system or the secondary display system.

In some embodiments, the method further comprises extracting one or more other passcodes from the sound signal. Transmitting the passcode and the data to the third computer system further causes the third computer system to identify the secondary display system as corresponding to one or more of the other passcodes based on the lookup in the data structure.

In some embodiments, the computer system further comprises a sound-detecting module configured to detect the sound signal, wherein the sound-detecting module includes one or more of: a built-in microphone; and an interface which can be coupled to an external microphone.

In some embodiments, the sound signal is one or more of: an ultrasonic wave; and a wave with a frequency greater than or equal to a first predetermined threshold. The sound signal is not one or more of: an infrasound wave; and a wave with a frequency less than a second predetermined threshold. The passcode is one or more of: encoded in the sound signal as audio information based on an audio protocol; and indicated by a predetermined symbol which is prepended to the passcode.

In some embodiments, the method further comprises detecting a deactivation condition, including one or more of: receiving a command to stop the information displayed on the computer system from being displayed on the secondary display system; detecting that the data is not transmitted to or received by the secondary display system within a predetermined period of time; determining that a physical distance between the first computer system and the secondary display system is greater than a predetermined distance; and determining that the sound signal is no longer detected. The method further comprises, in response to detecting the deactivation condition, transmitting termination information to the third computer system, which causes the third computer system to refrain from transmitting the data to the secondary display system, which causes the secondary display system to stop displaying, on the secondary display system, the information displayed on the computer system.

In some embodiments, transmitting the data to the secondary display system is in response to receiving a command to activate a synchronous display on the secondary display system of the information displayed on the computer system.

Another embodiment provides a display system (e.g., a projector device) for facilitating screen projection, the display system comprising a processor and a memory coupled to the processor and storing instructions, which when executed by the processor cause the processor to perform a method, the method comprising: determining a passcode which corresponds to the display system; determining audio information which includes the passcode; generating a sound signal which includes the audio information; and transmitting the sound signal to a second computer system, thereby allowing information displayed on the second computer system to be displayed on the display system.

In some embodiments, transmitting the sound signal to the second computer system causes the second computer system to: detect the sound signal; extract the passcode from the sound signal; and transmit the passcode and data displayed on the second computer system to a third computer system, wherein the passcode is encoded based on an audio protocol. Transmitting the passcode and the data to the third computer system causes the third computer system to: receive the encoded passcode and the data; decode the encoded passcode based on the audio protocol to obtain the passcode; identify the display system as corresponding to the passcode based on a lookup in a data structure; and transmit the data to the display system, which causes the display system to display, on the display system, information which is the same as the information displayed on the second computer system.

In some embodiments, the third computer system is configured to: detect a deactivation condition, including one or more of: receiving a command to stop the information displayed on the second computer system from being displayed on the display system; detecting that the data is not transmitted by or received from the second computer system within a predetermined period of time; and determining that a physical distance between the display system and the second computer system is greater than a predetermined distance. The third computer system is further configured to, in response to detecting the deactivation condition, refrain from transmitting, by the third computer system, the data to the display system, which causes the display system to stop displaying, on the display system, the information displayed on the second computer system.

In some embodiments, determining the audio information comprises one or more of: generating, by the display system, the audio information; obtaining, by the display system from the third computer system, the audio information; and obtaining, by the display system from a fourth computer system, the audio information, wherein the display system is coupled to the fourth computer system.

In some embodiments, the fourth computer system comprises: an audio-information generating module configured to generate the audio information; and a communication module configured to receive the data from the third computer system, and transmit the data and the audio information to the display system.

In some embodiments, the display system further comprises a sound-transmitting module configured to transmit the sound signal, wherein the sound-transmitting module includes one or more of: a built-in speaker; and an interface which can be coupled to an external speaker.

BRIEF DESCRIPTION OF THE FIGURES

In the figures, like reference numerals refer to the same figure elements.

DETAILED DESCRIPTION

Figure 1A:
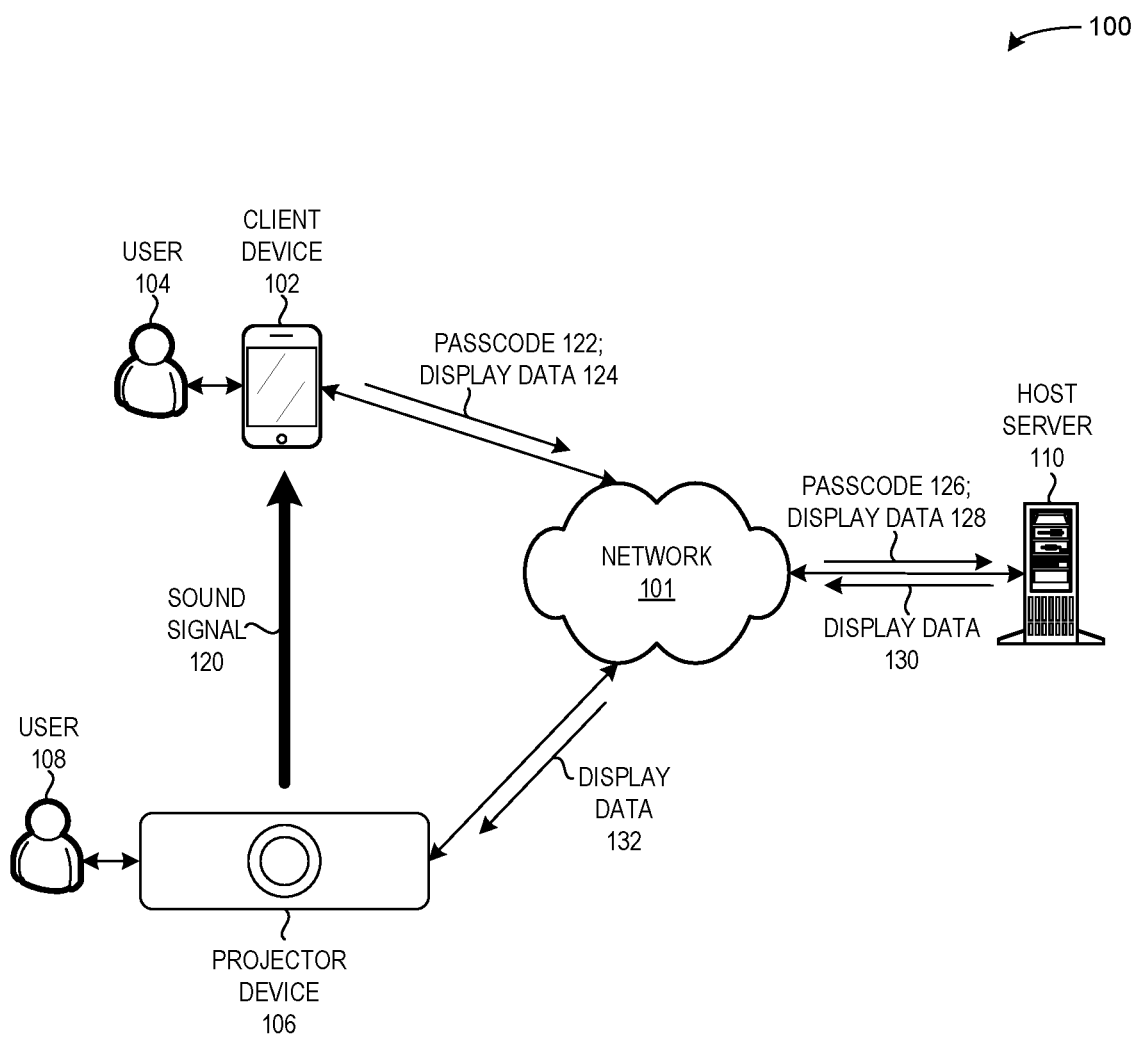
FIG. 1A illustrates an exemplary environment and communication that facilitate wireless screen projection, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which improves the success rate of wireless screen projection by encoding a passcode in a sound signal. A projector device can transmit the sound signal, which is detected by a client device, and the client device can extract the passcode and cause data displayed on the client device to be synchronously displayed on the projector device.

Wireless screen projection is a technology where information on a client device is transmitted wirelessly to a projector device, which displays the data of the client device. Current technologies for wireless screen projection require the manual input of a passcode in order to establish the connection and facilitate the wireless screen projection. However, manual input may result in user errors, which can cause a failure of the wireless screen projection and decrease the success rate of the wireless screen projection. Furthermore, a user may forget to turn off the projector device when leaving the meeting room, which can result in a security breach.

The embodiments described herein solve the problem of increased error from a user's manual input by transmitting an encoded passcode in a sound signal, and further solve the problem of a security breach by terminating the wireless screen projection when the user (and his client device) leave the meeting room (i.e., move a certain distance away from the projector device). In an exemplary scenario in, e.g., a meeting room, a projector device can send a sound signal which includes an encoded passcode. A client device (such as a user's laptop or smartphone) can listen for and detect the sound signal, extract the passcode, and cause the wireless screen projection to begin (e.g., cause the data displayed on the client device to be synchronously displayed on the projector device). The system can also terminate the screen projection upon detecting a deactivation condition, e.g., no longer detecting the sound signal, detecting that the client device has moved more than a certain distance away from the projector device, determining that data is not received by the projector device within a predetermined period of time, and receiving a deactivation command.

Furthermore, the embodiments described herein provide improvements to the protection of network security, where the improvements are fundamentally technological. Embodiments of the present invention provide a technological solution (e.g., generating audio information which includes an encoded passcode, transmitting the sound signal with the audio information, detecting the sound signal, and enabling wireless screen projection) to the technological problem of the efficiency and security involved in wireless screen projection.

Exemplary Network and Communication (with a Wireless Projector Device)

FIG. 1A illustrates an exemplary environment 100 and communication that facilitate wireless screen projection, in accordance with an embodiment of the present application. Environment 100 can include: a user 104 associated with a client computing device 102; a user 108 associated with a projector device 106; and a host server 110. Client device 102 and projector device 106 can communicate with host server 110 via a network 101. Client device 102 (and "client device" as referred to herein) can include a microphone and can be a tablet, a mobile phone, an electronic reader, a laptop computer, a desktop computer, or any other computing device. Projector device 106 (and "projector device" as referred to herein) can be a computing device and/or an optical device that projects an image (or moving images) onto a surface, such as a projection screen, and can include a speaker. Host server 110 (and "host server" as referred to herein) can be any computing device or server which can perform the functionality described herein.

As an example, projector device 106 may be physically located in a meeting room, and client device 102 may be brought into the meeting room. During operation, user 108 can send, via projector device 106, a sound signal 120 to client device 102. Client device 102 can detect sound signal 120, and extract a passcode 122 from sound signal 120. Passcode 122 may be encoded based on an audio protocol. The information carried in sound signal 120 can be a repeating series of digits such as "#0E3H#0E3H#0E3H . . . " where the symbol "#" may be used to indicate that the following symbols include the passcode. If wireless screen projection is needed during the meeting, user 104 can turn on client device 102, which can detect sound signal 120 through its microphone. The microphone of client device 102 can record the detected sound signal for a predetermined period of time and obtain the encoded passcode. Client device 102 can decode the encoded passcode based on a predetermined audio protocol, and determine that the passcode is "0E3H" (passcode 122).

Client device 102 may be currently displaying data 124 on its screen. Client device 102 can send passcode 122 and display data 124 via network 101 to host server 110 (which is received as passcode 126 and display data 128). Host server 110 can identify a projector device (i.e., projector device 106) as corresponding to passcode 126. For example, host server 110 can perform a lookup in a data structure or a table, which includes entries that map one or more passcodes to a specific projector device.

Host server 110 can send display data 130, via network 101, to projector device 106 (which is received as display data 132). Upon receiving display data 132, projector device 106 can project display data 132, e.g., onto a projection screen or other surface for viewing, thus causing the data displayed on client device 102 to be synchronously displayed on or by projector device 106.

When the meeting ends, user 104 may take client device 102 with him out of the meeting room, but may forget to proactively terminate the wireless screen projection. In this case, client device 102 may determine that it can no longer detect sound signal 120 and thus actively terminate the wireless screen projection. Detection of this and other conditions (as described herein) may help to ensure the security of the data.

Exemplary Network and Communication (with a Non-Wireless Projector Device Coupled to a Network Communication Device)

Figure 1B:
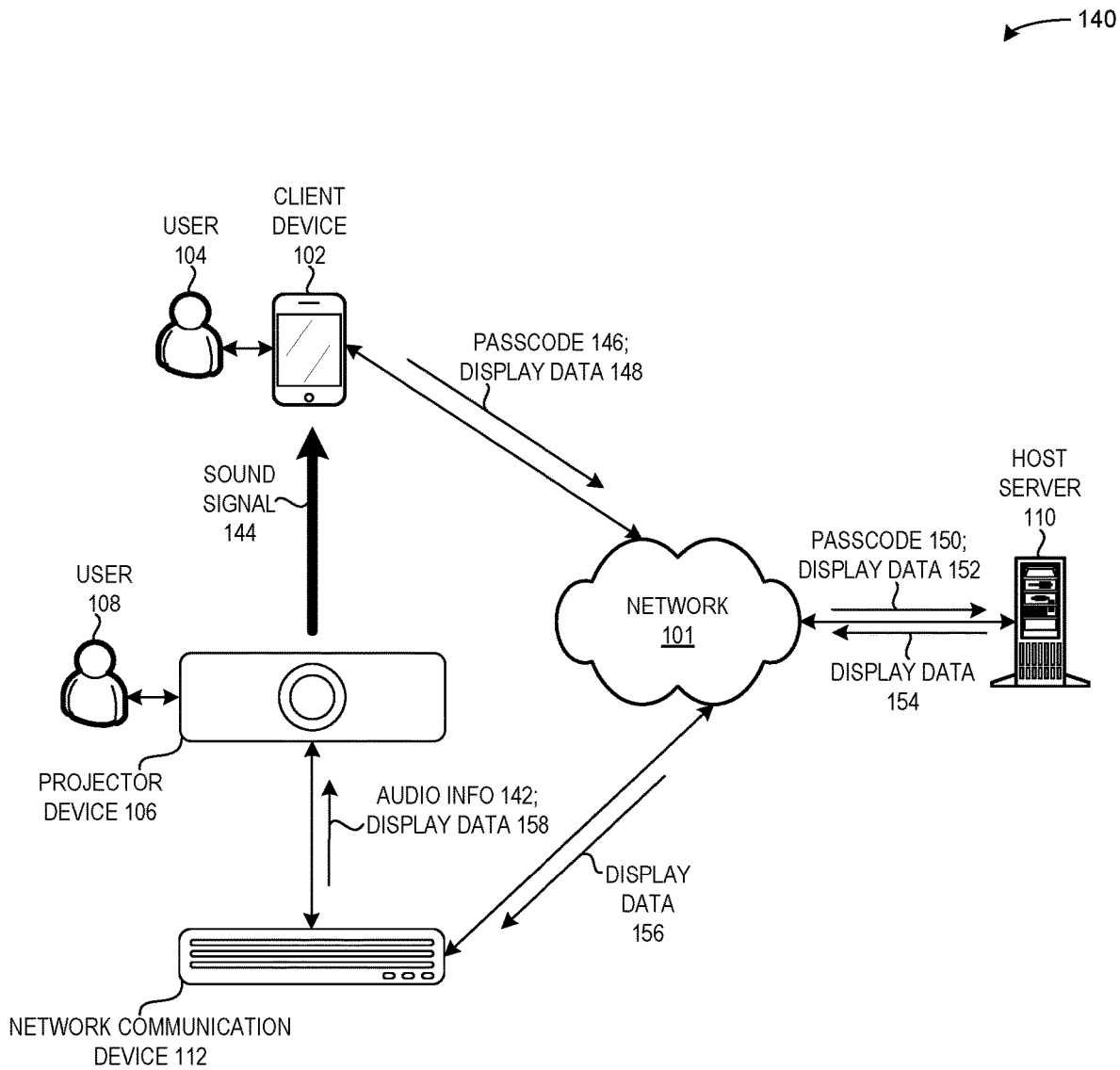
FIG. 1B illustrates an exemplary environment and communication that facilitate wireless screen projection, in accordance with an embodiment of the present application.

FIG. 1B illustrates an exemplary environment 140 and communication that facilitate wireless screen projection, in accordance with an embodiment of the present application. Environment 140 is similar to environment 100, except in environment 140, the projector device is a non-wireless projector. That is, projector device 106 cannot communicate via network 101 with host server 110. Instead, projector device 106 can be directly coupled or wired to a network communication device 112, which can communicate via network 101 with host server 110. In some embodiments, projector 106 and network communication 112 can be "coupled" or communicate via a Bluetooth connection, a local network, or other wireless connection which does not involve network 101.

During operation, network communication device 112 can send audio information 142 to projector 106, via the coupled connection. User 108 can send to client device 102, via projector device 106, a sound signal 144 which includes audio information 142. Client device 102 can detect sound signal 144, and extract a passcode 146 from sound signal 144. Passcode 146 may be encoded based on an audio protocol. Client device 102 may be currently displaying data 148 on its screen. Client device 102 can send passcode 146 and display data 148 via network 101 to host server 110 (which is received as passcode 150 and display data 152). Host server 110 can identify a network communication device (i.e., network communication device 112) as corresponding to passcode 150. For example, host server 110 can perform a lookup in a data structure or a table, which includes entries that map one or more passcodes to a specific network communication device.

Host server 110 can send display data 154, via network 101, to network communication device 112 (which is received as display data 156). Upon receiving display data 156, network communication device 112 can send display data 158 to projector device 106. Projector device 106 can then project display data 158, e.g., onto a projection screen or other surface for viewing, thus causing the data displayed on client device 102 to be synchronously displayed on or by projector device 106.

Features of an Exemplary Passcode and an Exemplary Sound Signal

A passcode as described herein may be used to indicate a projector device. One projector device can correspond to one passcode, or one projector device can correspond to a group of passcodes (e.g., a plurality of passcodes, or multiple passcodes). The relationships between a respective projector device and its corresponding passcode(s) can be maintained by the host server, e.g., in a table or a data structure. The passcode can be configured based on various methods. In one method, the host server can configure the relationship between each projector device and passcode(s), and can notify a respective projector device of its corresponding passcode(s), which allows the projector device to generate the audio information of the sound signal which carries the passcode. In another method, each projector device can determine its own passcode(s), and notify the host server of its determined passcode(s), which allows the host server to maintain the relationships between a respective projector device and the corresponding passcode(s).

Similarly, one network communication device can correspond to one passcode or to a group of passcodes (e.g., a plurality of passcodes, or multiple passcodes). The relationships between a respective network communication device and its corresponding passcode(s) can be maintained by the host server, e.g., in a table or a data structure. The host server can configure the relationship between each network communication device and passcode(s), and can notify a respective network communication device of its corresponding passcode(s), which allows the network communication device to generate the audio information of the sound signal which carries the passcode(s). Alternatively, each network communication device can determine its own passcode(s), and notify the host server of its determined passcode(s), which allows the host server to maintain the relationships between a respective network communication device and the corresponding passcode(s).

The passcode can include one or more of the following information: numbers; letters; and symbols. The passcode can be one type or combination of types of numbers, letters, and symbols. For example, the passcode can be a combination of three numbers and one letter, or a combination of 2 numbers and 2 symbols. The number of digits contained in the passcode is not set or fixed, and can be, e.g., one digit, four digits, five digits, or 50 digits.

The passcode may be encoded and included or indicated in audio information, which can be an audio file of the sound signal. The format of the sound signal can be based on any known protocol or format. The audio information may also include transmission control information of the sound signal or wave, e.g., the transmission frequency or transmission time of the sound wave in a predetermined period of time.

When the passcode is encoded as audio information, a predetermined symbol (e.g., the "#" symbol) may be added in front of or prepended to the passcode to mark the passcode and indicate that a certain number of digits after the predetermined symbol is the passcode.

A sound signal (or a screen projection sound signal) as described herein can be an ultrasonic wave, e.g., with a frequency that is greater than or equal to 22,000 Hertz. The sound signal can carry the passcode based on any currently known technique. The passcode may be encoded in the sound signal. In some embodiments, the sound signal does not use or include an infrasound wave, e.g., with a frequency that is less than 20 Hz, as this may be harmful to the human body.

The sound signal may include or carry a dynamic passcode, such that the passcode is different each time that the sound signal is transmitted (i.e., where one projector device or network communication device corresponds to multiple passcodes). The client device can send the most recent passcode and display data to the host server after obtaining the most recent passcode from the projector device, which allows the client device to continuously carry out the wireless screen projection on the projector device.

Method for Facilitating Wireless Screen Projection (with a Wireless Projector Device)

Figure 2A:
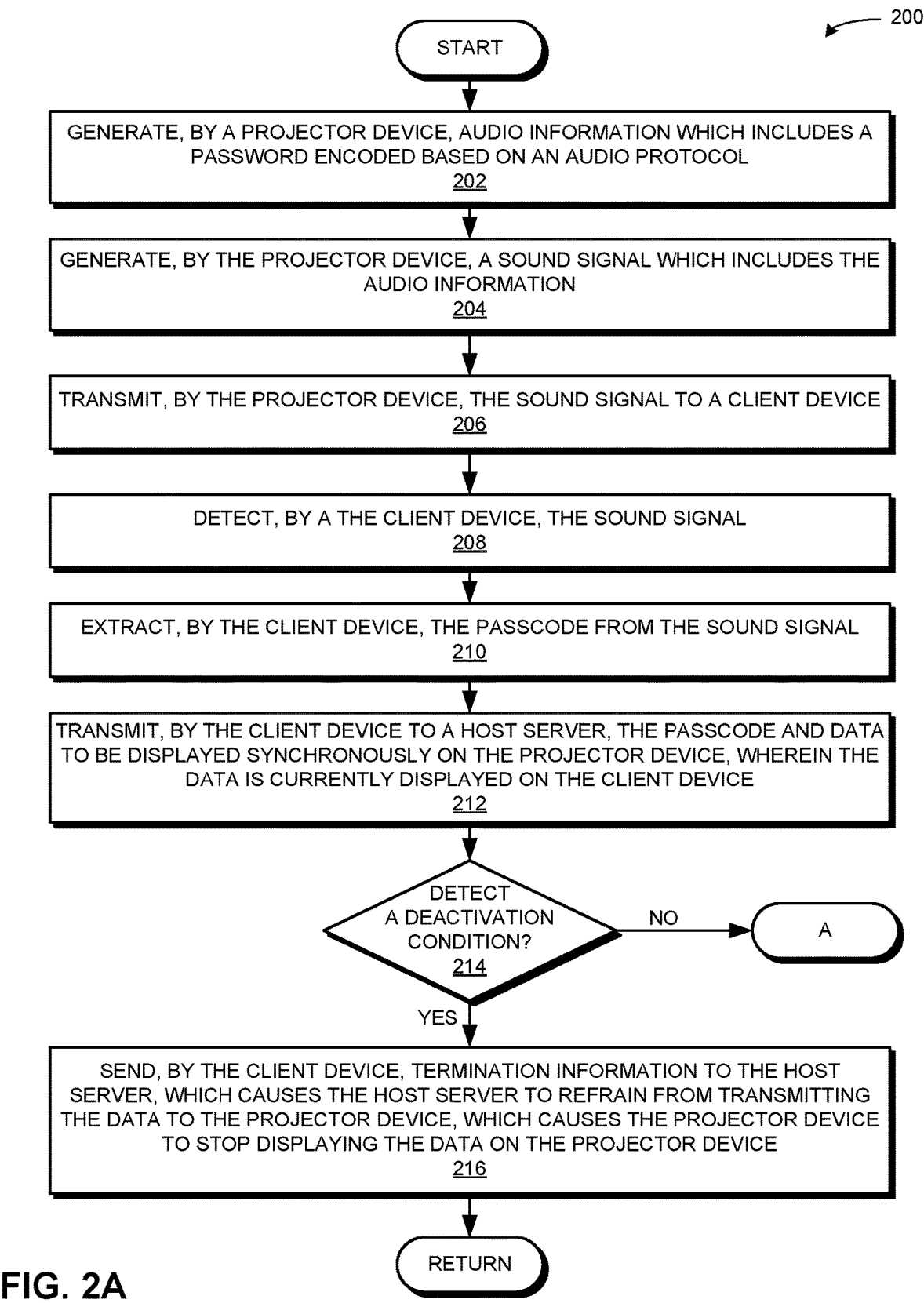
FIG. 2A presents a flowchart illustrating a method for facilitating wireless screen projection, including actions by a client device, a host device, and a projector device, in accordance with an embodiment of the present application.

FIG. 2A presents a flowchart 200 illustrating a method for facilitating wireless screen projection, including actions by a client device, a host device, and a projector device, in accordance with an embodiment of the present application. During operation, a projector device generates audio information which includes a password encoded based on an audio protocol (operation 202). The projector device generates a sound signal which includes the audio information (operation 204). In some embodiments, instead of the projector device generating the audio information, a host server generates the audio information and transmits the audio information to the projector device, and the projector device generates the sound signal which includes the audio information received from the host server. The projector device transmits the sound signal to a client device (operation 206). The projector device may also transmit the sound signal for a predetermined period of time or at predetermined intervals.

The client device detects the sound signal (operation 208). The client device extracts the passcode from the sound signal (operation 210). The client device transmits, to a host server, the passcode and data to be displayed synchronously on the project device, wherein the data is currently displayed on the client device (operation 212). If a deactivation condition is detected (decision 214), the client device sends, to the host server, termination information, which causes the host server to refrain from transmitting the data to the projector device, which causes the projector device to stop displaying the data on the projector device (operation 216). If a deactivation condition is not detected (decision 214), the operation continues as described at Label A of FIG. 2B.

The host server can store, e.g., in a data structure: a mapping between the passcode and the projector device; a mapping between one or more other passcodes and the projector device; and a mapping between the passcode (or passcodes) and a network communication device, wherein the projector device is coupled to the network communication device (e.g., non-wireless projector device 106 coupled to network communication device 112 of FIG. 1B, and as further described below in relation to FIGS. 3A and 3B). The host server can create these stored mappings, or can store these mappings based on a notification received from the client device or the projector device.

Figure 2B:
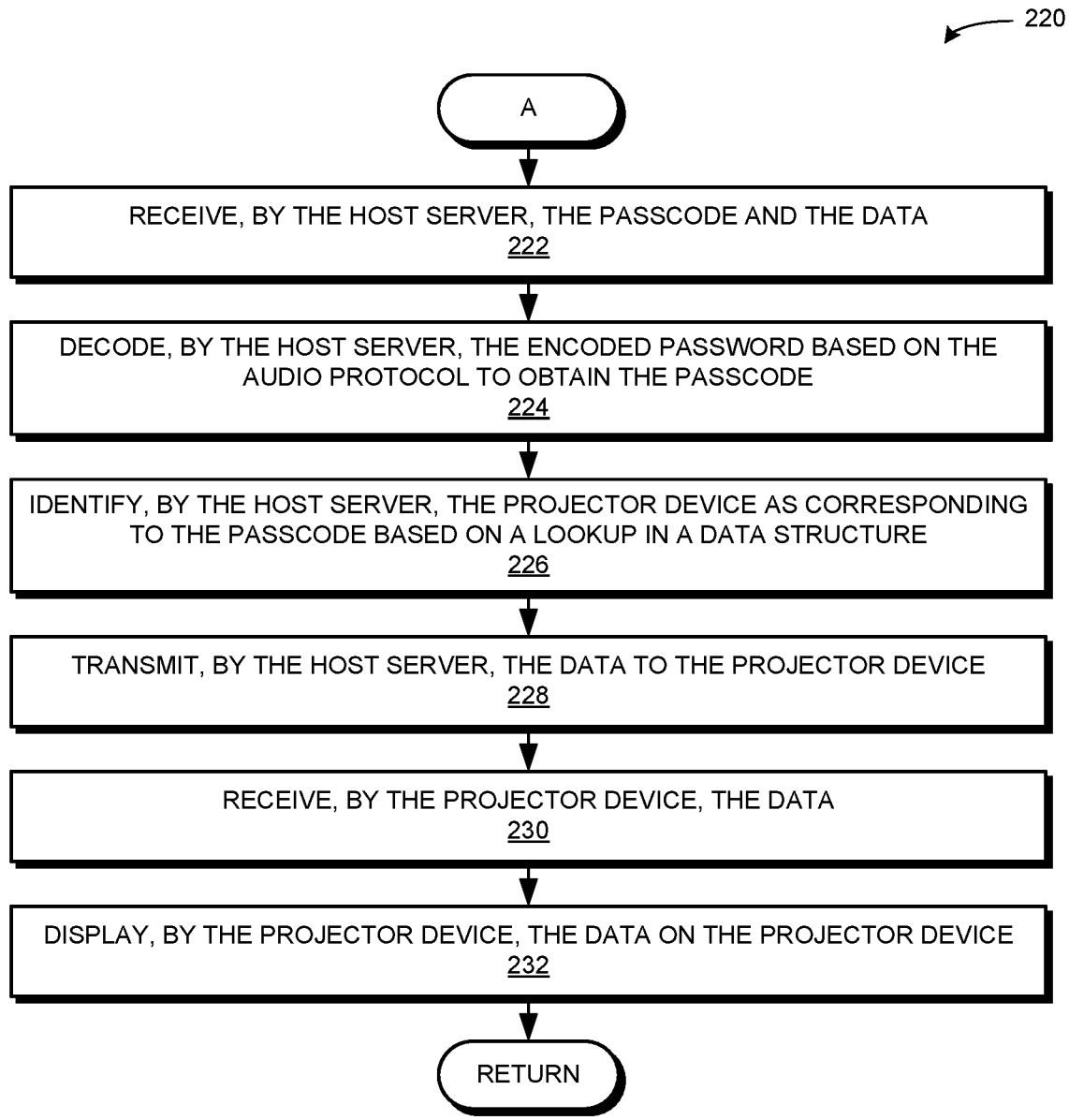
FIG. 2B presents a flowchart illustrating a method for facilitating wireless screen projection, including actions by a client device, a host device, and a projector device, in accordance with an embodiment of the present application.

FIG. 2B presents a flowchart 220 illustrating a method for facilitating wireless screen projection, including actions by a client device, a host device, and a projector device, in accordance with an embodiment of the present application. During operation, the host server receives the passcode and the data (operation 222). The host server decodes the encoded password based on the audio protocol to obtain the passcode (operation 224). The host server identifies the projector device as corresponding to the passcode based on a lookup in a data structure (operation 226). In this way, the host server determines which projector device corresponds to the received passcode. The host server transmits the data to the projector device (operation 228). The projector device receives the data (operation 230) and displays the data on the projector device (operation 232).

Method for Facilitating Wireless Screen Projection (with a Non-Wireless Projector Device Coupled to a Network Communication Device)

Figure 3A:
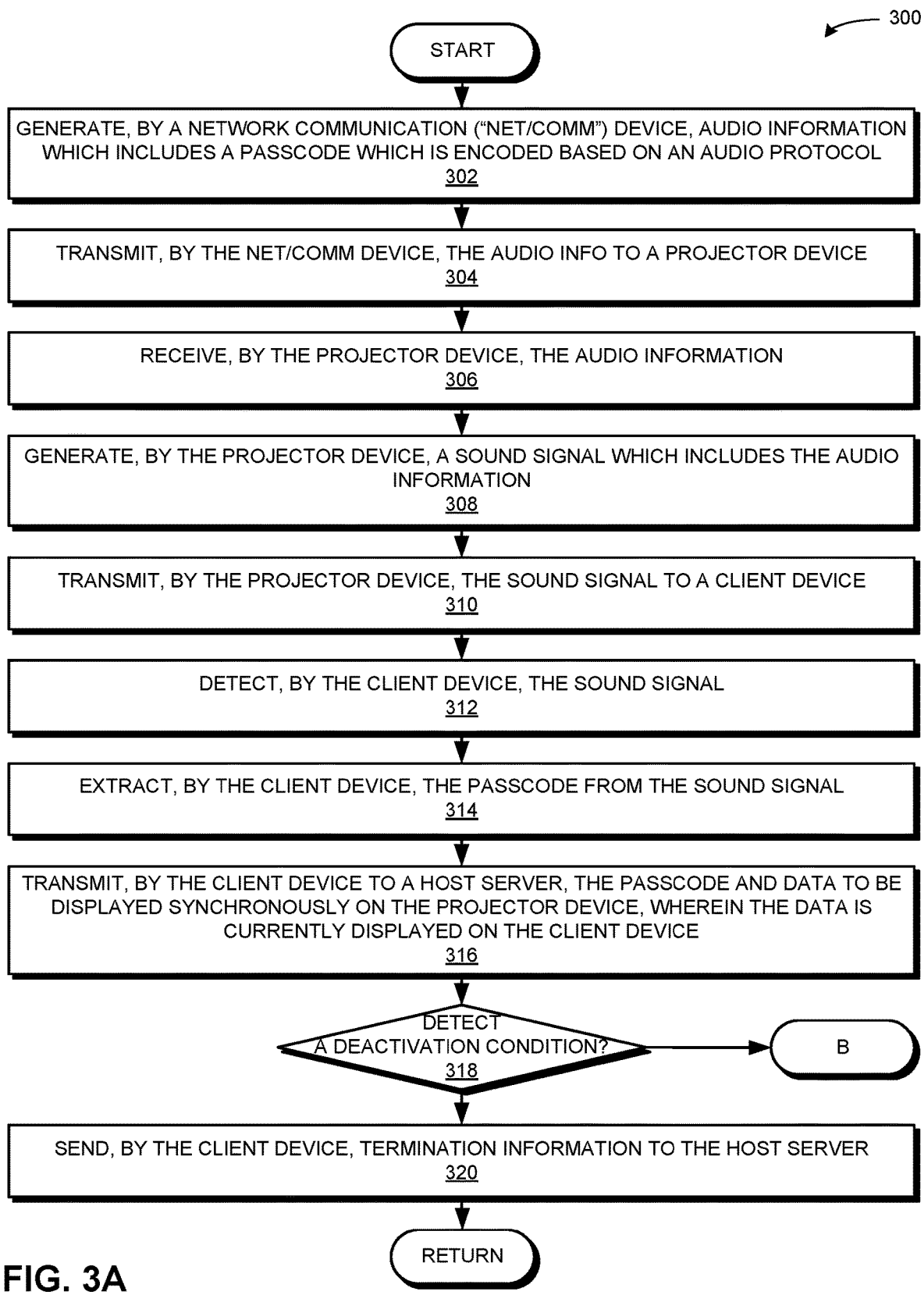
FIG. 3A presents a flowchart illustrating a method for facilitating wireless screen projection, including actions by a client device, a host device, a network communication device, and a projector device, in accordance with an embodiment of the present application.

FIG. 3A presents a flowchart 300 illustrating a method for facilitating wireless screen projection, including actions by a client device, a host device, a network communication device, and a projector device, in accordance with an embodiment of the present application. During operation, a network communication device generates audio information which includes a passcode which is encoded based on an audio protocol (operation 302). The network communication device transmits the audio information to a projector device (operation 304).

The projector device receives the audio information (operation 306). The projector device generates a sound signal which includes the audio information (operation 308). The projector device transmits the sound signal to a client device (operation 310). The projector device may also transmit the sound signal for a predetermined period of time or at predetermined intervals.

The client device detects the sound signal (operation 312). The client device extracts the passcode from the sound signal (operation 314). The client device transmits, to a host server, the passcode and data to be displayed synchronously on the projector device, wherein the data is currently displayed on the client device (operation 316). If a deactivation condition is detected (decision 318), the client device sends termination information to the host server (operation 320), which causes the host server to refrain from transmitting the data to the projector device, which causes the projector device to stop displaying the data on the projector device. If a deactivation condition is not detected (decision 318), the operation continues as described at Label B of FIG. 3B.

Figure 3B:
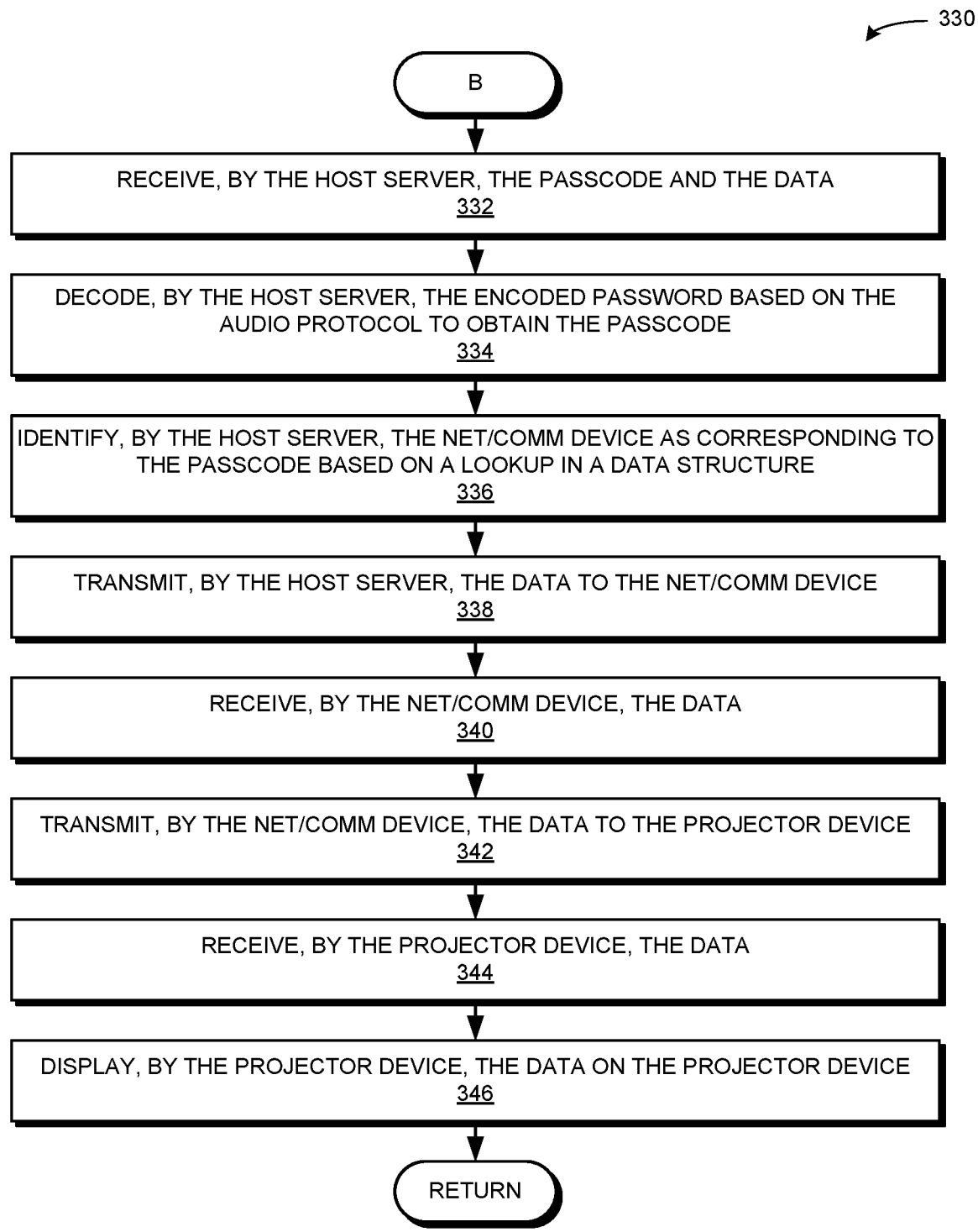
FIG. 3B presents a flowchart illustrating a method for facilitating wireless screen projection, including actions by a client device, a host device, a network communication device, and a projector device, in accordance with an embodiment of the present application.

FIG. 3B presents a flowchart 330 illustrating a method for facilitating wireless screen projection, including actions by a client device, a host device, a network communication device, and a projector device, in accordance with an embodiment of the present application. During operation, the host server receives the passcode and the data (operation 332). The host server decodes the encoded password based on the audio protocol to obtain the passcode (operation 334). The host server identifies the network communication device as corresponding to the passcode based on a lookup in a data structure (operation 336). In this way, the host server determines which network communication device corresponds to the received passcode. The host server transmits the data to the network communication device (operation 338). The network communication device receives the data (operation 340). The network communication device transmits the data to the projector device (operation 342). The projector device receives the data (operation 344) and displays the data on the projector device (operation 346).

Exemplary Computer System and Device (Client Computing Device)

Figure 4A:
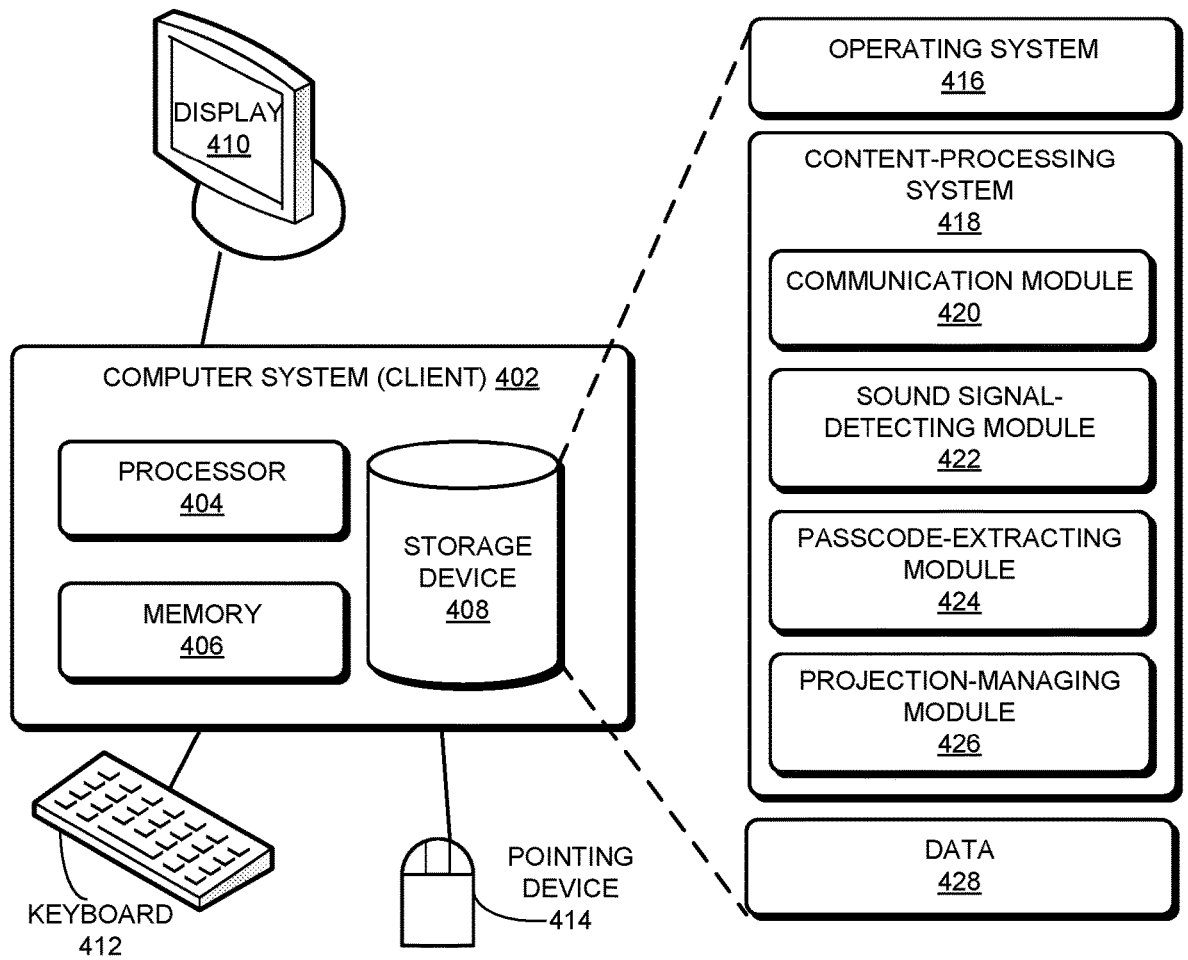
FIG. 4A illustrates an exemplary computer system (a client computing device) that facilitates wireless screen projection, in accordance with an embodiment of the present application.

FIG. 4A illustrates an exemplary computer system (a client computing device) 402 that facilitates wireless screen projection, in accordance with an embodiment of the present application. Computer system 402 includes a processor 404, a memory 406, and a storage device 408, which can communicate with each other via, e.g., a bus. Memory 406 can include a volatile memory (e.g., RAM) that serves as a managed memory, and can be used to store one or more memory pools. Furthermore, computer system 402 can be coupled to a display device 410, a keyboard 412, and a pointing device 414. Storage device 408 can store an operating system 416, a content-processing system 418, and data 428. Computer system 402 can be a client computing device, such as client device 102 in FIGS. 1A and 1B.

Content-processing system 418 can include instructions, which when executed by computer system 402, can cause computer system 402 to perform methods and/or processes described in this disclosure. Specifically, content-processing system 418 may include instructions for sending and/or receiving data packets to/from other network nodes across a computer network, e.g., to/from a client device, a host device, a server, a network communication device, and an end device (communication module 420). Computer system 402 can be a "first computing device" or a "client device."

Content-processing system 418 can further include instructions for detecting, by the client device, a sound signal associated with a secondary display system, wherein the sound signal includes a passcode (sound signal-detecting module 422). Content-processing system 418 can include instructions for extracting the passcode from the sound signal (passcode-extracting module 424). Content-processing system 418 can include instructions for processing the passcode (projection-managing module 426). Content-processing system 418 can also include instructions for transmitting data displayed on the client device to the secondary display system (communication module 420 and projection-managing module 426).

Data 428 can include any data that is required as input or that is generated as output by the methods and/or processes described in this disclosure. Specifically, data 428 can store at least: a data packet; audio information; a detected sound signal; a passcode; an encoded passcode; an audio protocol; data that is currently displayed on computer system 402 (e.g., on display 410); and data to be synchronously displayed on a projector device.

Figure 4B:
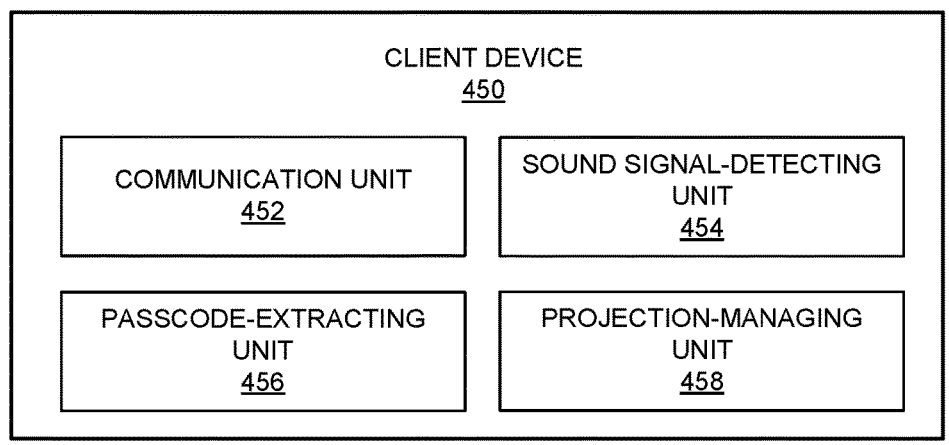
FIG. 4B illustrates an exemplary device (a client computing device) that facilitates wireless screen projection, in accordance with an embodiment of the present application.

FIG. 4B illustrates an exemplary device (a client device) 450 that facilitates wireless screen projection, in accordance with an embodiment of the present application. Device 450 can comprise a plurality of units or apparatuses which may communicate with one another via a wired, wireless, or electrical communication channel. Device 450 may be realized using one or more integrated circuits, and may include fewer or more units or apparatuses than those shown in FIG. 4B. Further, device 450 may be integrated in a computer system, or realized as a separate device which is capable of communicating with other computer systems and/or devices. Specifically, device 450 can comprise units 452-458 which perform functions or operations similar to modules 420-426 of computer system 402 of FIG. 4A, including: a communication unit 452; a sound signal-detecting unit 454 (which can include a built-in microphone and/or an interface which can be coupled to an external microphone); a passcode-extracting unit 456; and a projection-managing unit 458.

Computer system 402 of FIG. 4A and client device 450 of FIG. 4B can correspond to client device 102 of FIGS. 1A and 1B. Furthermore, computer system 402 and client device 450 have modules or units which can perform operations 208, 210, 212, 214, and 216 of FIG. 2A and operations 312, 314, 316, 318, and 320 of FIG. 2B.

Exemplary Computer System and Device (Projector Device)

Figure 5A:
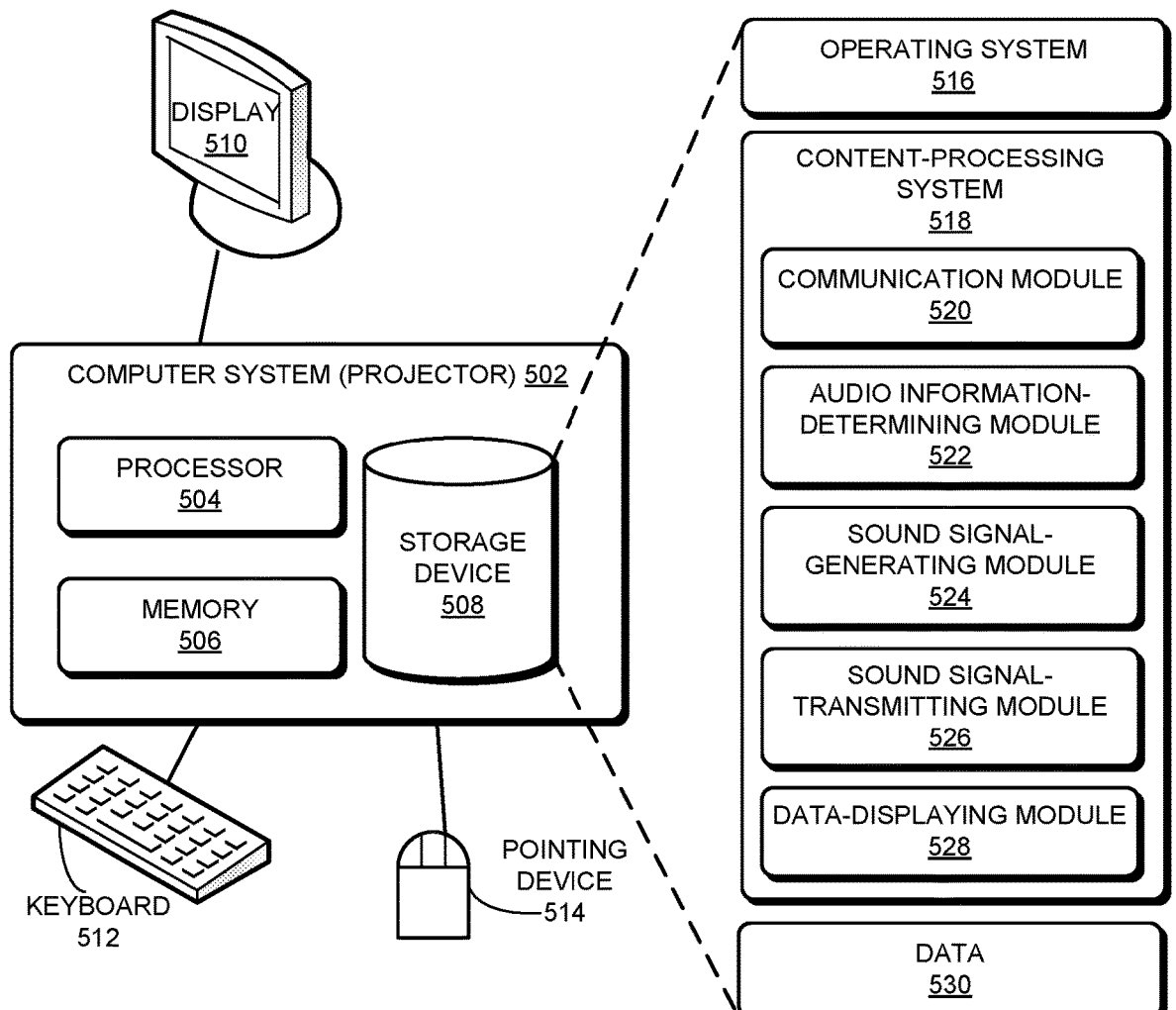
FIG. 5A illustrates an exemplary computer system (a projector device) that facilitates wireless screen projection, in accordance with an embodiment of the present application.

FIG. 5A illustrates an exemplary computer system (a projector device) 502 that facilitates wireless screen projection, in accordance with an embodiment of the present application. Computer system 502 includes a processor 504, a memory 506, and a storage device 508, which can communicate with each other via, e.g., a bus. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Display device 510 can be a device with a screen on which data may be displayed, and can be a projector screen or other surface upon which the projector device can display an image or images. Storage device 508 can store an operating system 516, a content-processing system 518, and data 528. Computer system 502 can be a projector device, such as projector device 106 in FIGS. 1A and 1B.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, e.g., to/from a client device, a host device, a server, a network communication device, and an end device (communication module 520). Computer system 502 can be "a second computing device" or "a projector device."

Content-processing system 518 can further include instructions for determining, by a display system, a passcode which corresponds to the display system (audio information-determining module 522). Content-processing system 518 can further include instructions for determining audio information which includes the passcode (audio information-determining module 522). Content-processing system 518 can include instructions for: generating the audio information; obtaining the audio information from a third computing device; and obtaining the audio information from a fourth computing device which is coupled to the projector device (audio information-determining module 522).

Content-processing system 518 can include instructions for generating a sound signal which includes the audio information (sound signal-generating module 524). Content-processing system 518 can include instructions for transmitting the sound signal to the client device, which causes information displayed on the client device to be synchronously displayed on the projector device (sound signal-transmitting module 526). Content-processing system 518 can include instructions for displaying data received from the third computing device or the fourth computing device (data-displaying module 528).

Data 530 can include any data that is required as input or that is generated as output by the methods and/or processes described in this disclosure. Specifically, data 530 can store at least: a data packet; audio information; a sound signal; a passcode; an encoded passcode; an audio protocol; data that is currently displayed on a client device; and data which is to be synchronously displayed on computer system 502 (e.g., on display 510 or on a screen/surface which can display the projected image or images of the data which is to be synchronously displayed on computer system 502).

Figure 5B:
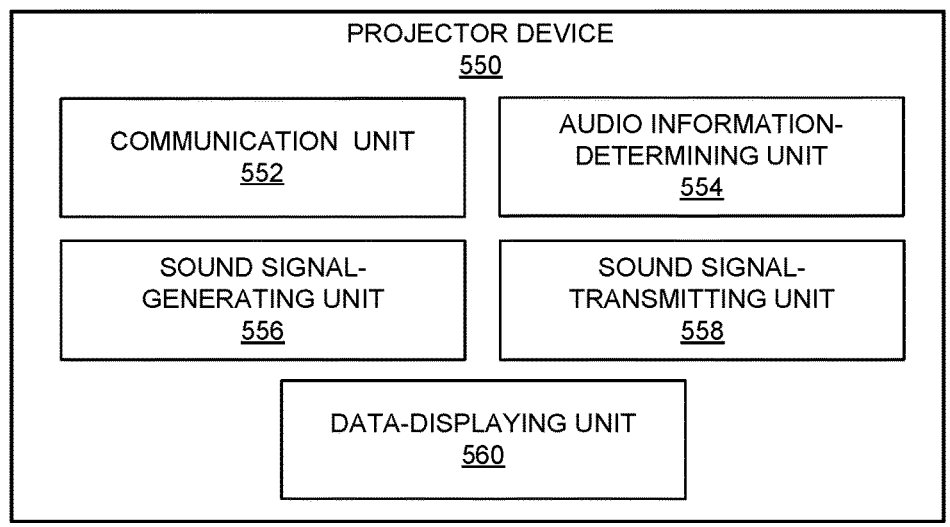
FIG. 5B illustrates an exemplary device (a projector device) that facilitates wireless screen projection, in accordance with an embodiment of the present application.

FIG. 5B illustrates an exemplary device (a projector device) 550 that facilitates wireless screen projection, in accordance with an embodiment of the present application. Device 550 can comprise a plurality of units or apparatuses which may communicate with one another via a wired, wireless, or electrical communication channel. Device 550 may be realized using one or more integrated circuits, and may include fewer or more units or apparatuses than those shown in FIG. 5B. Further, device 550 may be integrated in a computer system, or realized as a separate device which is capable of communicating with other computer systems and/or devices. Specifically, device 550 can comprise units 552-560 which perform functions or operations similar to modules 520-528 of computer system 502 of FIG. 5A, including: a communication unit 552; an audio information-determining unit 554; a sound signal-generating unit 556; a sound signal-transmitting unit 558 (which can include a built-in speaker and/or an interface which can be coupled to an external speaker); and a data-displaying unit 560.

Computer system 502 of FIG. 5A and projector device 550 of FIG. 5B can correspond to projector device 106 of FIGS. 1A and 1B. Furthermore, computer system 502 and client device 550 have modules or units which can perform operations 202, 204, 206, 230, and 232 of FIGS. 2A and 2B and operations 306, 308, 310, 344, and 346 of FIGS. 3A and 3B.

Exemplary Computer System and Device (Network Communication Device)

Figure 6A:
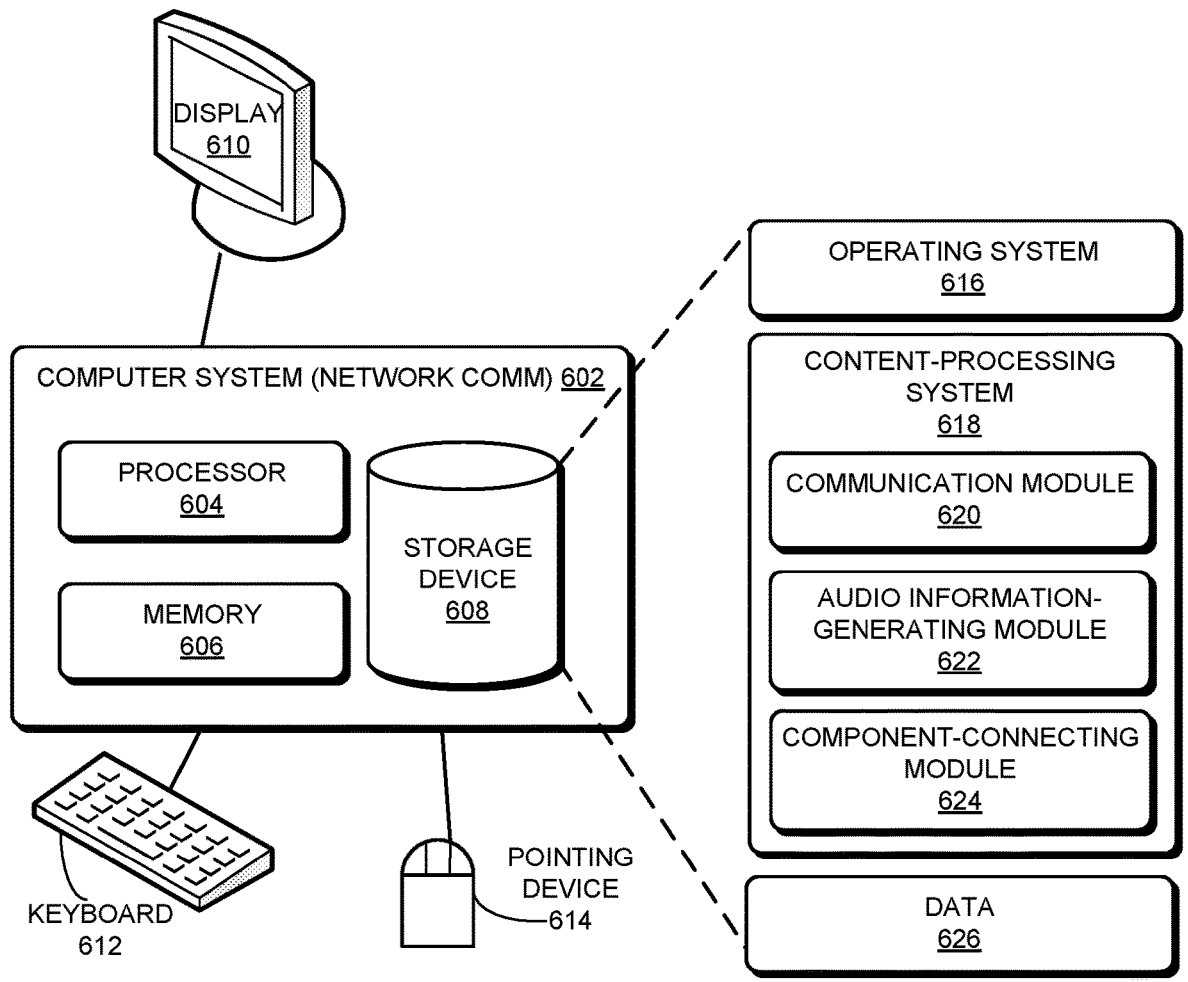
FIG. 6A illustrates an exemplary computer system (a network communication device) that facilitates wireless screen projection, in accordance with an embodiment of the present application.

FIG. 6A illustrates an exemplary computer system (a network communication device) 602 that facilitates wireless screen projection, in accordance with an embodiment of the present application. Computer system 602 includes a processor 606, a memory 606, and a storage device 608, which can communicate with each other via, e.g., a bus. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 528. Computer system 602 can be a network communication device, such as network communication device 112 in FIG. 1B.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, e.g., to/from a client device, a host device, a server, a network communication device, and an end device (communication module 620). Computer system 602 can be "a fourth computing device" or "a network communication device."

Content-processing system 618 can further include instructions for generating the audio information (audio information-generating module 622). Content-processing system 618 can include instructions for receiving data from a third computing device, and transmitting the data and the audio information to a projector device (communication module 620). Content-processing system 618 can also include instructions for connecting a component, such as by coupling the network communication device to a projector device (component-connecting module 624).

Data 626 can include any data that is required as input or that is generated as output by the methods and/or processes described in this disclosure. Specifically, data 626 can store at least: a data packet; audio information; a passcode; an encoded passcode; an audio protocol; and data that is currently displayed on a client device which is to synchronously displayed on a projector device.

Figure 6B:
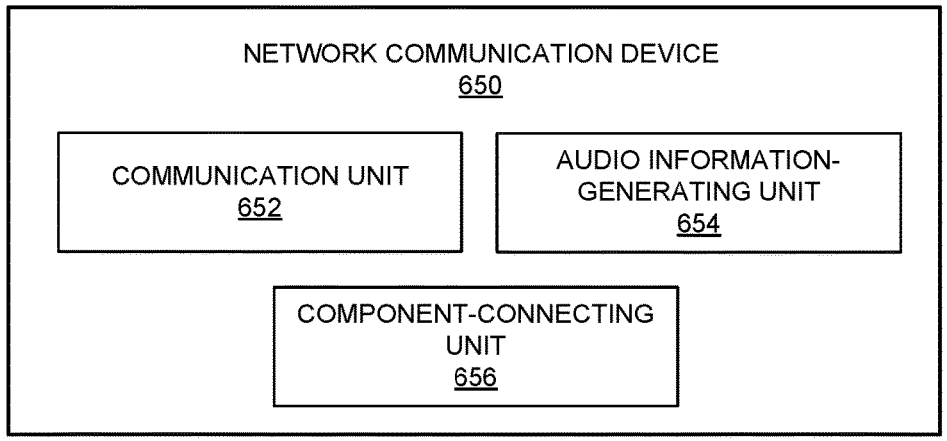
FIG. 6B illustrates an exemplary device (a network communication device) that facilitates wireless screen projection, in accordance with an embodiment of the present application.

FIG. 6B illustrates an exemplary device (a network communication device) 650 that facilitates wireless screen projection, in accordance with an embodiment of the present application. Device 650 can comprise a plurality of units or apparatuses which may communicate with one another via a wired, wireless, or electrical communication channel. Device 650 may be realized using one or more integrated circuits, and may include fewer or more units or apparatuses than those shown in FIG. 6B. Further, device 650 may be integrated in a computer system, or realized as a separate device which is capable of communicating with other computer systems and/or devices. Specifically, device 650 can comprise units 652-656 which perform functions or operations similar to modules 620-624 of computer system 602 of FIG. 6A, including: a communication unit 652; an audio information-generating unit 622; and a component-connecting unit 624.

Computer system 602 of FIG. 6A and network communication device 650 of FIG. 6B can correspond to network communication device 112 of FIG. 1B. Furthermore, computer system 602 and client device 650 have modules or units which can perform operations 302, 304, 340, and 342 of FIGS. 3A and 3B.

Exemplary Computer System and Device (Host Computing Device)

Figure 7A:
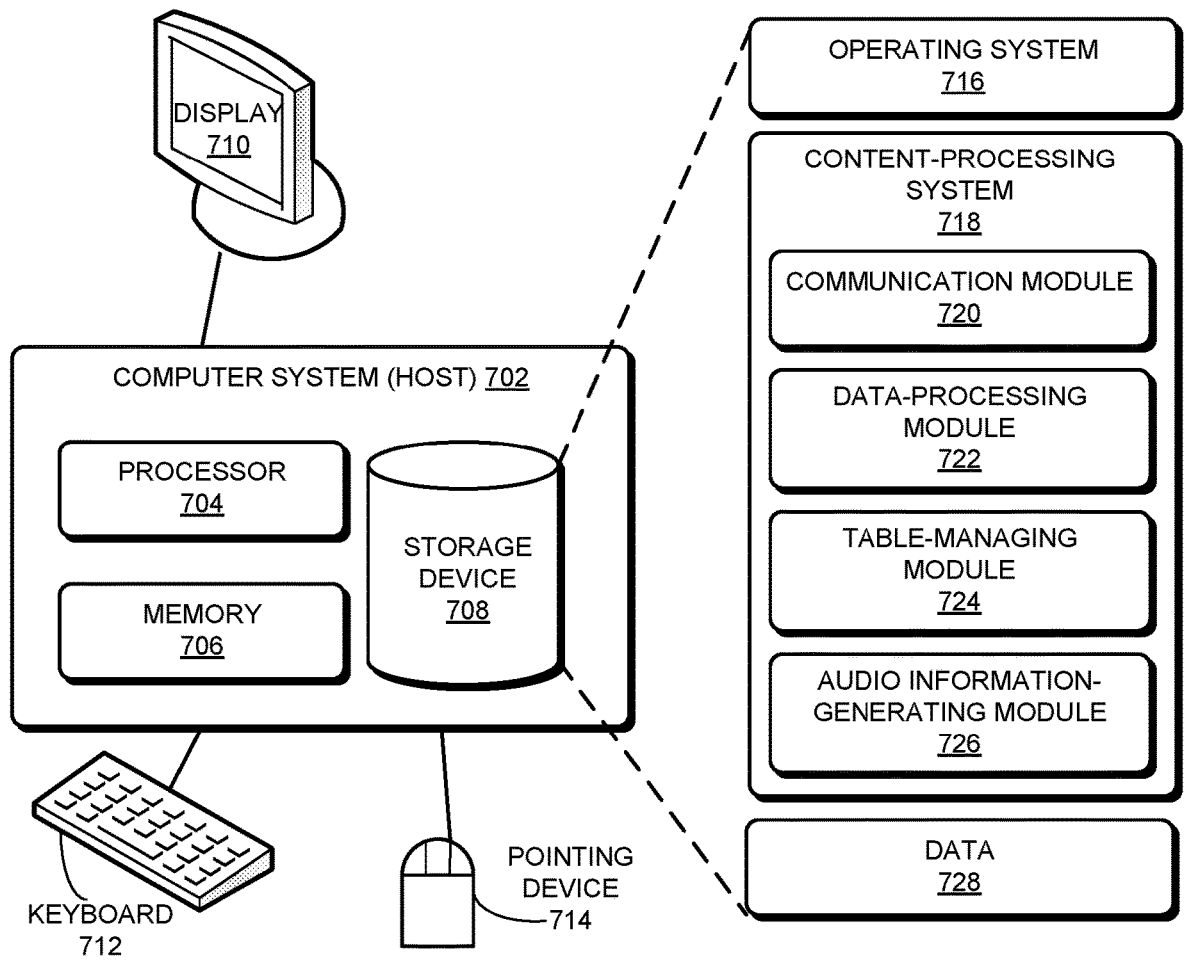
FIG. 7A illustrates an exemplary computer system (a host computing device) that facilitates wireless screen projection, in accordance with an embodiment of the present application.

FIG. 7A illustrates an exemplary computer system (a host computing device) 702 that facilitates wireless screen projection, in accordance with an embodiment of the present application. Computer system 702 includes a processor 706, a memory 706, and a storage device 708, which can communicate with each other via, e.g., a bus. Memory 706 can include a volatile memory (e.g., RAM) that serves as a managed memory, and can be used to store one or more memory pools. Furthermore, computer system 702 can be coupled to a display device 710, a keyboard 612, and a pointing device 714. Storage device 708 can store an operating system 716, a content-processing system 718, and data 728. Computer system 702 can be a host computing device, such as host server 110 in FIGS. 1A and 1B.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, e.g., to/from a client device, a host device, a network communication device, a projector device, a server, and an end device (communication module 720). Computer system 702 can be "a third computing device" or "a host device."

Content-processing system 718 can further include instructions for receiving an encoded passcode and data (communication module 720). Content-processing system 718 can include instructions for decoding the encoded passcode based on an audio protocol to obtain the passcode (data-processing module 722). Content-processing system 718 can include instructions for identifying a projector device as corresponding to the passcode based on a lookup in a data structure (table-managing module 724). Content-processing system 718 can include instructions for transmitting the data to a network communication device or the projector device (communication module 720).

Content-processing system 718 can include instructions for storing, in the data structure, various mappings between one or more passcodes, the projector device, and the network communication device (table-managing module 724). Content-processing system 718 can include instructions for creating the stored mappings or storing the mappings based on a notification from a client device (table-managing module 724). Content-processing system 718 can include instructions for generating audio information and transmitting the audio information to a network communication device or the projector device (audio information-generating module 726).

Data 728 can include any data that is required as input or that is generated as output by the methods and/or processes described in this disclosure. Specifically, data 728 can store at least: a data packet; audio information; a sound wave; a sound signal; a passcode; an encoded passcode; an audio protocol; data that is currently displayed on a client device; data which is to be synchronously displayed on a projector device; a data structure; a mapping between the passcode and the projector device; a mapping between one or more other passcodes and the projector device; and a mapping between the passcode (or passcodes) and a network communication device.

Figure 7B:
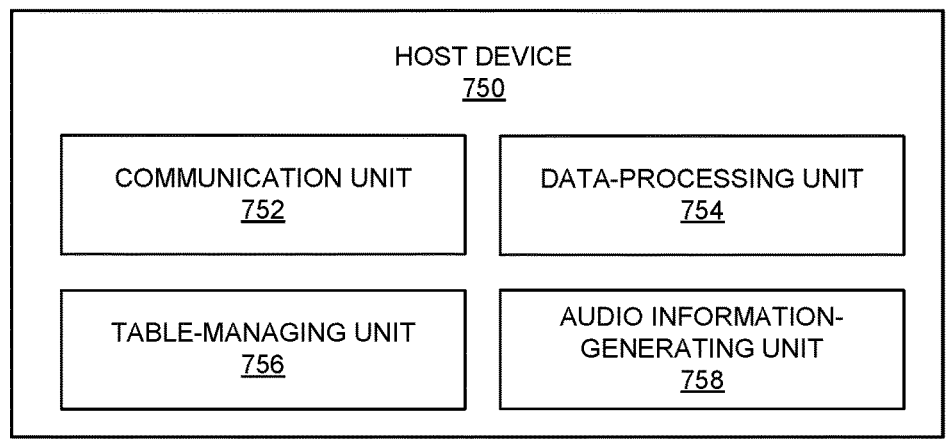
FIG. 7B illustrates an exemplary device (a host computing device) that facilitates wireless screen projection, in accordance with an embodiment of the present application.

FIG. 7B illustrates an exemplary device (a host computing device) 750 that facilitates wireless screen projection, in accordance with an embodiment of the present application. Device 750 can comprise a plurality of units or apparatuses which may communicate with one another via a wired, wireless, or electrical communication channel. Device 750 may be realized using one or more integrated circuits, and may include fewer or more units or apparatuses than those shown in FIG. 7B. Further, device 750 may be integrated in a computer system, or realized as a separate device which is capable of communicating with other computer systems and/or devices. Specifically, device 750 can comprise units 752-758 which perform functions or operations similar to modules 720-726 of computer system 702 of FIG. 7A, including: a communication unit 752; a data-processing unit 754; a table-managing unit 756; and an audio information-generating unit 758.

Computer system 702 of FIG. 7A and host device 750 of FIG. 7B can correspond to host server 110 of FIGS. 1A and 1B. Furthermore, computer system 702 and host device 750 have modules or units which can perform operations 222, 224, 226, and 228 of FIG. 2B and operations 332, 334, 336, and 338 of FIG. 3B.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Another embodiment provides an information system, comprising: a first device and a second device; wherein, the second device is suitable for transmitting a sound signal carrying a passcode; the first device is suitable for detecting the sound signal, and obtaining the passcode from the detected sound signal; the first device is also suitable for sending data to the second device by utilizing the obtained passcode.

For example, the first device can be a client computing device, the second device can be a projector device, and the passcode code can be the passcode as noted in the above embodiments; the first device can send the passcode together with the data (e.g., the screen display data of the first device) to the host device which knows the corresponding relationship between the second device and the passcode after obtaining the passcode through detecting the sound signal, and then the host device can transmit the data sent from the first device to the second device.

This embodiment also provides a method for information transmission, comprising: transmitting a sound signal carrying the passcode; and receiving the data sent from the device which obtains the passcode through detecting the sound signal, by utilizing the passcode.

This embodiment can be applied in the second device in the information system, and the device which obtains the passcode through detecting the sound signal corresponds to the first device in the information system; i.e., the second device transmits the sound signal carrying the passcode, and the second device can receive the data sent from the first device by utilizing the obtained passcode.

This embodiment also provides a method for information transmission, comprising: detecting the sound signal and obtaining the passcode from the detected sound signal; and utilizing the passcode to send data to the device which transmits the sound signal.

This embodiment can be applied in the first device of the information system, and the device which transmits the sound signal corresponds to the second device in the information system, i.e., the first device obtains the passcode through detecting the sound signal, and sends data to the second device by utilizing the passcode.

Another embodiment provides a method for obtaining a screen projection code, comprising the following steps: a client device detecting a sound signal, obtaining a passcode from the detected sound signal, and displaying the passcode.

In this embodiment, the client device can be, but is not limited to, a mobile terminal such as a computer or smart phone.

In this embodiment, the client device can carry out the detection of a sound signal through a built-in or external microphone, and after the sound signal is detected, it is decoded with relevant audio protocols to obtain the screen projection code carried therein, and after the passcode is obtained, the obtained passcode is displayed on the display interface. The client device can carry out wireless screen projection operation according to the user command when needed by utilizing the passcode.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A first computer system for facilitating screen projection, the first computer system comprising:
   a processor; and
   a memory coupled to the processor and storing instructions, which when executed by the processor cause the processor to perform a method, the method comprising:
      detecting a sound signal associated with a secondary display system, wherein the sound signal includes a passcode;
      extracting the passcode from the sound signal;
      processing the passcode, which involves transmitting the passcode to a third computer system,
      wherein the passcode is encoded based on one or more of an audio protocol and indicated by a predetermined symbol prepended to the passcode;
      transmitting, by the third computer system to the secondary display system, data displayed on the computer system to the secondary display system, thereby allowing information displayed on the first computer system to be displayed on the secondary display system; and
      responsive to no data being transmitted to or received by the secondary display system within a predetermined period of time:
      transmitting termination information to the third computer system; and
      refraining, by the third computer system, from transmitting the data to the secondary display system, which causes the secondary display system to stop displaying, on the secondary display system, the information displayed on the first computer system.

2. The computer system of claim 1,
   wherein transmitting the passcode and the data to the third computer system causes the third computer system to:
      receive the encoded passcode and the data;
      decode the encoded passcode based on the audio protocol to obtain the passcode;
      identify the secondary display system as corresponding to the passcode based on a lookup in a data structure; and
      transmit the data to the secondary display system.

3. The computer system of claim 2, wherein transmitting the data to the secondary display system causes the secondary display system to:
   receive the data; and
   display, on the secondary display system, information which is the same as the information displayed on the computer system.

4. The computer system of claim 2, wherein the third computer system is configured to store, in the data structure, one or more of:
   a mapping between the passcode and the secondary display system;
   a mapping between one or more other passcodes and the secondary display system; and
   a mapping between the passcode or passcodes and a fourth computer system, wherein the secondary display system is coupled to the fourth computer system,
   wherein the third computer system creates the stored mappings or wherein the third computer system stores the mappings based on a notification from the first computer system or the secondary display system.

5. The computer system of claim 2, wherein the method further comprises:
  extracting one or more other passcodes from the sound signal, wherein transmitting the passcode and the data to the third computer system further causes the third computer system to:
    identify the secondary display system as corresponding to one or more of the other passcodes based on the lookup in the data structure.

6. The computer system of claim 1, wherein the computer system further comprises a sound-detecting module configured to detect the sound signal, wherein the sound-detecting module includes one or more of:
  a built-in microphone; and
  an interface which can be coupled to an external microphone.

7. The computer system of claim 1, wherein the sound signal is one or more of:
  an ultrasonic wave; and
  a wave with a frequency greater than or equal to a first predetermined threshold;
  wherein the sound signal is not one or more of:
    an infrasound wave; and
    a wave with a frequency less than a second predetermined threshold; and
  wherein the passcode is one or more of:
    encoded in the sound signal as audio information based on an audio protocol; and
    indicated by a predetermined symbol which is prepended to the passcode.

8. The computer system of claim 2, wherein the method further comprises:
  detecting a deactivation condition, including one or more of:
    receiving a command to stop the information displayed on the computer system from being displayed on the secondary display system;
    determining that a physical distance between the first computer system and the secondary display system is greater than a predetermined distance; and
    determining that the sound signal is no longer detected; and
  in response to detecting the deactivation condition, transmitting the termination information to the third computer system, which causes the third computer system to refrain from transmitting the data to the secondary display system, which causes the secondary display system to stop displaying, on the secondary display system, the information displayed on the computer system.

9. The computer system of claim 1, wherein transmitting the data to the secondary display system is in response to receiving a command to activate a synchronous display on the secondary display system of the information displayed on the computer system.

10. A display system for facilitating screen projection, the display system comprising:
  a processor; and
  a memory coupled to the processor and storing instructions, which when executed by the processor cause the processor to perform a method, the method comprising:
    determining a passcode which corresponds to the display system;
    determining audio information which includes the passcode, wherein the passcode is encoded based on one or more of an audio protocol and indicated by a predetermined symbol prepended to the passcode;
    generating a sound signal which includes the audio information;
    transmitting the sound signal to a second computer system, which causes the second computer system to process the passcode and transmit to a third computer system the passcode and information displayed on the second computer system, thereby allowing the information displayed on the second computer system to be displayed on the display system; and
    responsive to no data being transmitted to or received by the display system within a predetermined period of time:
      transmitting termination information to the third computer system; and
    refraining, by the third computer system, from transmitting the data to the display system, which causes the display system to stop displaying, on the display system, the information displayed on the second computer system.

11. The display system of claim 10, wherein transmitting the sound signal to the second computer system causes the second computer system further to:
  detect the sound signal;
  extract the passcode from the sound signal; and
  wherein transmitting the passcode and the data to the third computer system causes the third computer system to:
    receive the encoded passcode and the data;
    decode the encoded passcode based on the audio protocol to obtain the passcode;
    identify the display system as corresponding to the passcode based on a lookup in a data structure; and
    transmit the data to the display system, which causes the display system to display, on the display system, information which is the same as the information displayed on the second computer system.

12. The display system of claim 11, wherein the third computer system is configured to:
  detect a deactivation condition, including one or more of:
    receiving a command to stop the information displayed on the second computer system from being displayed on the display system;
    determining that a physical distance between the display system and the second computer system is greater than a predetermined distance; and
    in response to detecting the deactivation condition, refrain from transmitting, by the third computer system, the data to the display system, which causes the display system to stop displaying, on the display system, the information displayed on the second computer system.

13. The display system of claim 11, wherein the third computer system is configured to store, in the data structure, one or more of:
  a mapping between the passcode and the display system;
  a mapping between one or more other passcodes and the display system; and
  a mapping between the display system and a fourth computer system, wherein the display system is coupled to the fourth computer system,
  wherein the third computer system creates the stored mappings or wherein the third computer system stores the mappings based on a notification from the display system or the second computer system.

14. The display system of claim 11, wherein determining the audio information comprises one or more of:

generating, by the display system, the audio information;
obtaining, by the display system from the third computer system, the audio information; and
obtaining, by the display system from a fourth computer system, the audio information, wherein the display system is coupled to the fourth computer system.

15. The display system of claim 14, wherein the fourth computer system comprises:
an audio-information generating module configured to generate the audio information; and
a communication module configured to:
receive the data from the third computer system; and
transmit the data and the audio information to the display system.

16. The display system of claim 10, wherein the display system further comprises a sound-transmitting module configured to transmit the sound signal, wherein the sound-transmitting module includes one or more of:
a built-in speaker; and
an interface which can be coupled to an external speaker.

17. A computer-implemented method for facilitating screen projection, the method comprising:
detecting, by a first computing device, a sound signal associated with a secondary display device, wherein the sound signal includes a passcode;
extracting the passcode from the sound signal;
processing the passcode, which involves transmitting the passcode to a third computer system,
wherein the passcode is encoded based on one or more of an audio protocol and indicated by a predetermined symbol prepended to the passcode;
transmitting, by the third computer system to the secondary display system, data displayed on the first computing device to the secondary display device, thereby allowing information displayed on the first computing device to be displayed on the secondary display device; and
responsive to no data being transmitted to or received by the secondary display system within a predetermined period of time:
transmitting termination information to the third computer system; and
refraining, by the third computer system, from transmitting the data to the secondary display system, which causes the secondary display system to stop displaying, on the secondary display system, the information displayed on the computer system.

18. The method of claim 17,
wherein transmitting the passcode and the data to the third computing device causes the third computing device to:
receive the encoded passcode and the data;
decode the encoded passcode based on the audio protocol to obtain the passcode;
identify the secondary display device as corresponding to the passcode based on a lookup in a data structure; and
transmit the data to the secondary display device.

19. The method of claim 18, wherein transmitting the data to the secondary display device causes the secondary display device to:
receive the data; and
display, on the secondary display device, information which is the same as the information displayed on the first computing device.

20. The method of claim 17, further comprising:
detecting a deactivation condition, including one or more of:
receiving a command to stop the information displayed on the first computing device from being displayed on the secondary display device;
determining that a physical distance between the first computing device and the secondary display device is greater than a predetermined distance; and
determining that the sound signal is no longer detected; and
in response to detecting the deactivation condition, transmitting the termination information to the third computing device, which causes the third computing device to refrain from transmitting the data to the secondary display device, which causes the secondary display device to stop displaying, on the secondary display device, the information displayed on the first computing device.

* * * * *